US009373168B2

(12) United States Patent
Van Leeuwen et al.

(10) Patent No.: US 9,373,168 B2
(45) Date of Patent: Jun. 21, 2016

(54) METHOD FOR AUTOMATICALLY ADJUSTING A FOCAL PLANE OF A DIGITAL PATHOLOGY IMAGE (75) Inventors: Marinus Bastiaan Van Leeuwen, Eindhoven (NL); Jelte Peter Vink, Waalre (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 153 days.

(21) Appl. No.: 14/232,099

(22) PCT Filed: Jun. 28, 2012

(86) PCT No.: PCT/IB2012/053285
§ 371 (c)(1),
(2), (4) Date: Jan. 13, 2014

(87) PCT Pub. No.: WO2013/008121
PCT Pub. Date: Jan. 17, 2013

(65) Prior Publication Data
US 2014/0169655 A1    Jun. 19, 2014

Related U.S. Application Data (60) Provisional application No. 61/507,165, filed on Jul. 13, 2011.

(51) Int. Cl.
*G06K 9/00* (2006.01)
*G06T 7/00* (2006.01)
*G02B 21/16* (2006.01)
*G02B 21/24* (2006.01)
*G06T 5/50* (2006.01)

(52) U.S. Cl.
CPC .............. *G06T 7/0012* (2013.01); *G02B 21/16* (2013.01); *G02B 21/244* (2013.01); *G06T 5/50* (2013.01); *G06T 2207/10056* (2013.01); *G06T 2207/10148* (2013.01); *G06T 2207/20092* (2013.01); *G06T 2207/30024* (2013.01)

(58) Field of Classification Search
None
See application file for complete search history.

(56) References Cited

U.S. PATENT DOCUMENTS

| | | | | | |
|---|---|---|---|---|---|
| 4,698,625 | A | * | 10/1987 | McCaskill | G06F 3/04845 345/157 |
| 6,026,174 | A | * | 2/2000 | Palcic | G01N 1/30 382/128 |
| 7,526,116 | B2 | * | 4/2009 | Armogida | G06K 9/0014 382/133 |
| 8,055,034 | B2 | * | 11/2011 | Dube | G06T 7/0044 382/128 |
| 8,421,855 | B2 | * | 4/2013 | Buckland | A61B 3/102 348/77 |
| 8,559,705 | B2 | * | 10/2013 | Ng | G06T 5/001 345/157 |
| 9,032,334 | B2 | * | 5/2015 | Yu | G06F 3/017 715/849 |

(Continued)

OTHER PUBLICATIONS

Levoy, Marc et al "Light Field Microscopy", ACM Transactions on Graphics, vol. 25, Jan. 2006.

(Continued)

*Primary Examiner* — Chan Park
*Assistant Examiner* — Iman K Kholdebarin (57) ABSTRACT An intelligent autofocus method and device for a digital pathology image, method are device are able to couple a feedback from the behavior of the user, for example by gaze tracking arrangement, to the actually focal representation of an image and adjust the imaging setup accordingly with regard to the focal plane. The adjustment is performed in such a way that the focal plane is selected which optimizes and sharpens the actual object of interest which was previously determined.

16 Claims, 7 Drawing Sheets

(56) References Cited

U.S. PATENT DOCUMENTS

| | | | |
|---|---|---|---|
| 2007/0152130 A1 | 7/2007 | Fomitchov | |
| 2008/0013168 A1* | 1/2008 | Maenle | G01N 1/30 359/383 |
| 2008/0131019 A1* | 6/2008 | Ng | G06T 5/001 382/255 |
| 2008/0225007 A1* | 9/2008 | Nakadaira | G06F 3/04815 345/173 |
| 2008/0229254 A1* | 9/2008 | Warner | G03F 3/04812 715/856 |
| 2009/0021387 A1* | 1/2009 | Hosono | G06F 3/0416 340/686.1 |
| 2009/0081775 A1* | 3/2009 | Hodneland | G01N 15/1468 435/317.1 |
| 2010/0182417 A1 | 7/2010 | Takagi | |
| 2010/0290678 A1 | 11/2010 | Dekel | |
| 2010/0296058 A1* | 11/2010 | Ho | A61B 3/0025 351/246 |
| 2011/0026797 A1 | 2/2011 | Declerck | |
| 2011/0116694 A1* | 5/2011 | Gareau | G01N 21/6458 382/128 |
| 2011/0316998 A1* | 12/2011 | Kishima | G02B 21/367 348/79 |
| 2013/0063571 A1* | 3/2013 | Ishii | G06T 15/205 348/47 |
| 2013/0293841 A1* | 11/2013 | Frison | A61B 3/1025 351/206 |
| 2014/0013273 A1* | 1/2014 | Ng | G06T 5/001 715/802 |
| 2014/0334711 A1* | 11/2014 | Vink | G06T 7/0012 382/133 |

OTHER PUBLICATIONS

Sun, Y. et al "Autofocusing Algorithm Selection in Computer Microscopy", Intelligent Robots and Systems, 2005.

Begelman, Grigory et al "Visual Positioning of Previously Defined ROIs on Microscopic Slides", IEEE Transactions on Information Technology in Biomedicine, vol. 10, No. 1, Jan. 2006.

* cited by examiner

METHOD FOR AUTOMATICALLY ADJUSTING A FOCAL PLANE OF A DIGITAL PATHOLOGY IMAGE

CROSS-REFERENCE TO PRIOR APPLICATIONS

This application is the U.S. National Phase application under 35 U.S.C. §371 of International Application No. PCT/IB2012/053285, filed on Jun. 28, 2012, which claims the benefit of U.S. Provisional Application Ser. No. 61/507,165, filed Jul. 13, 2011. These applications are hereby incorporated by reference herein.

FIELD OF THE INVENTION

The present invention relates to autofocus technology. In detail, the present invention relates to a method for automatically adjusting a focal plane of a digital pathology image, to a device for displaying images and for automatic focal plane adjustment of a digital pathology image, to a program element as well as to a computer-readable medium.

BACKGROUND OF THE INVENTION

In pathology, images of tissue samples or cell smears are analyzed under a microscope. In histopathology, the pathologist studies tissue in order to come to a diagnosis. A tissue sample is a thin slice of tissue mounted between two glass slides. This tissue is not perfectly flat and typically not perfectly aligned with the focal plane of the imaging system. Besides that, the cells of the tissue are positioned at different heights in the tissue layer. Consequently, a significant part of the cells in a two-dimensional tissue image can be out of focus. The same goes for cytopathology images, where the pathologist analyzes loose cells with several cell nuclei. These cells are present in a thin layer of mounting fluid between two glass slides. Typically, these cells will not be positioned in a perfectly flat layer and the layer will not be perfectly aligned with the focal plane of the imaging system.

Y. Sun et. al describe in "Autofocusing Algorithm Selection in Computer Microscopy" in Intelligent Robots and Systems, 2005, how a focal plane that provides a desired focus for an object of interest can be computed.

Rough interpretation of the cell does not require perfect focus of all cells. However, at the point of the analysis where details of the cells need to be studied, proper focus of the cells at hand is required. The pathologist uses the fine focus knob of an analogue microscope to navigate to the right plane of the focus. Recent trends indicate that pathology might be digitized in the future. This means that image data might be obtained with a digital scanner and stored on a server. For a subset of applications, image data will be obtained for a single focal plane. Information obtained in this way can be compared to the current practice of using a normal microscope where the fine focus knob is removed. In such a situation, no adjustment of the focal situation is possible any more. Due to these technological changes, digital pathology data will be analyzed from a monitor or by a computer. While the importance of the focus adjustment remains equally important, the means for changing focus might substantially be different.

SUMMARY OF THE INVENTION

It might be seen as an object of the present invention to provide for an improved automatic focus for digital pathology imaging.

There may be a need to provide an intelligent automatic focussing for digital pathology imaging which is addressed by the present invention.

The object of the present invention is solved by the subject-matter of the independent claims. Further embodiments and further advantages are incorporated in the dependent claims.

It should be noted that the embodiments of the invention described in the following similarly pertain to the method, to the device, to the program element as well as to the computer-readable medium. In other words, features that will be described with regard to the embodiments relating to a method of the present invention shall be understood to be comprised or implemented by the corresponding device, the program element and the computer-readable medium of the present invention, and vice versa. Furthermore, a person skilled in the art will gather from the above and the following description that, unless otherwise notified, in addition to any combination belonging to one type of subject-matter, also any combination between features relating to different subject-matters, in particular between features of the apparatus type claims and features of the method type claims, is considered to be disclosed with this application. Furthermore, all features can be combined providing synergetic effects that are more than the simple summation of the features.

According to an exemplary embodiment of the invention, a method for automatically adjusting a focal plane of a digital pathology image which comprises a plurality of individual biological objects like for example cells or parts of cells like cell nuclei is presented. The method comprises the step of providing for three-dimensional digital pathology image data comprising a plurality of focal planes and displaying the digital pathology image data as an image, wherein the displayed image has a focal plane which is of the plurality of focal planes. Furthermore the presented method comprises determining a position of interest in the image a user has and the step of calculating which individual biological object out of the plurality of objects is the object of interest. Moreover the method comprises automatically adjusting the focal plane of the displayed image to an adjusted focal plane based on the calculated object of interest.

In the context of the present invention the term "determining a position of interest in the image a user has" shall be understood as determining the position in the image, in which the user is currently interested in. This may be done by for example a gaze tracking arrangement or an arrangement tracking the coordinates of a mouse pointer. In other words said method step chooses the coordinates within the displayed pathology image, in which the user is interested in.

In the context of the present invention the term "individual biological object" may be seen as a biological entity like for example a cell, or parts of cell like for example a cell nucleus, a cell membrane and/or the cytoplasm of a cell. Therein the cells may be of different nature like for example fat cells, muscle cell, blood cells, tumor cells, tissue cells, organ cells, skin cells or any other cells. When the term "object" is used in the context of the present invention an "individual biological object" a defined above is meant. Furthermore in case of e.g. a breast cancer image the term "individual biological object" may be understood as tubili with a ring of cells i.e. a special conglomerate of cells is meant.

The object of interest may be the object being closest to the position of interest but also other criteria like e.g. the size of the objects may be taken into account for the determination of the object of interest. In case two or more objects of interest do have the same or essentially the same distance to the position of interest and one object is in focus and the other object is not in focus the present invention can provide for adjusting the focal plane such that the object which is out of focus is put into focus. Additionally if desired, a deviation threshold may be determined by the method or by a user below which to essentially equally distanced objects are treated as equally distanced by the present invention.

A first remarkable difference of the invention over the prior art is that the present invention adjusts the focal plane for displaying the pathology image to the user based on a calculated individual biological object of interest and not based on the entire contend of the image data. The object of interest is defined or determined by calculation and is an individual biological object as described above and in the following.

The prior art uses averaging parameters, which may lead to a compromise in focal adjustment ending up with a situation in which none of the objects comprised in the image is displayed entirely sharp or maximal sharp.

In contrast to the prior art, the present invention overcomes said disadvantage. Due to the determination of the individual biological object of interest based on the previously determined position of interest, the method according to the present invention bases the decision for focal adjustment on only one individual biological object like for example an individual cell or a cell nucleus. The method of the present invention is further specified to adjust the displaying based on the previously determined individual biological object of interest. For example the focal plane may be chosen for adjusting the displaying, which focal plane maximizes the sharpness of the calculated object of interest. Consequently, the presented method ensures, that at least one individual biological object is displayed in an optimal way to the user regarding sharpness.

In other words the presented method calculates the best focal plane for the calculated individual biological object of interest which unambiguously leads to a sharp optical representation of said object of interest. Thus, compromises regarding the sharpness of displayed individual biological objects in digital pathology image are avoided by the present invention.

The step of calculating which of the individual biological object out of the plurality of objects is the object of interest can be performed in various ways as will be explained hereinafter. For example for at least two individual biological objects like two cells or cell nuclei that are comprised in the image the respective distance to the already determined position of interest may be calculated. It may then be decided based on the shortest distance to the position of interest which of the at least two objects the object of interest is. The subsequent focal adjustment is then based on the defined or calculated object of interest.

According to another exemplary embodiment of the invention the step of calculating the object of interest comprises the step of calculating for at least two objects out of the plurality of objects which of the two objects has the smallest distance to the determined position of interest, wherein the object with the smallest distance is the object of interest.

In other words the presented method is for automatically adjusting a focal plane of a digital pathology image, which image comprises a plurality of objects, is presented. The method comprises the steps of providing for three-dimensional digital pathology image data comprising a plurality of focal planes, and further comprises the step of displaying the digital pathology image data as an image. Thereby, the displayed image has a focal plane which is out of the plurality of focal planes. The method further comprises a step of determining a position of interest in the image, and the step of calculating an object with the smallest distance to the determined position of interest. Therein, the object with the smallest distance is the object of interest. This embodiment further comprises the step of automatically adjusting the focal plane of the displayed image to an adjusted focal plane, which may be seen as a step of focusing the individual biological object of interest.

There might be a step included, if desired, which limits the search or calculation region to a fixed sized region, or to a region with incremental focus span. Even if the provided image data show or comprise only one object close to the position of interest this object will be recognized by the present method as the object of interest. In other words recognizing this object as being the first object you run into when the step of scanning the local environment of the position of interest may be sufficient.

Therefore, the presented method may additionally comprise the step of scanning the local environment of the position of interest may be sufficient.

In other words the presented method can be performed with data comprising one object and can also be performed with data comprising a plurality of objects. This will be described in detail hereinafter.

The term "adjusted focal plane" is to be understood in the context of the present invention as the optimal focal plane which is selected from the plurality of focal planes by the device during the adjustment of the focal situation with respect to the calculated individual biological object of interest.

Therein, the term "position of interest" should be understood as the position within the image at which the user is actually interested in when looking at the image. Therein the term "user looking at the image" may in the context of the present invention also be understood as a computer program or computer algorithm which operates on the data at the appropriate focal plane.

Moreover, the term "smallest distance" in the context of the present invention is to be understood as distance from position of interest to the respective object measured in the two-dimensional plane or maybe measured in three-dimensional plane, including information about the distance to the current focal plane. Such a distance measurement may for example be gathered from the following FIG. 2. Said measurement may also take into account the distance of the position of interest to the objects into the third, unshown dimension of FIG. 2. Therein information about the distance to the current focal plane may be used.

Furthermore, it should be noted, that not for each object of the plurality of objects that are comprised by the image, the respective distance needs necessarily to be calculated. The present invention also applies to a mode in which it is only partially calculated which respective distance of an object of a group of objects from the position of interest is the smallest within said group. Such a group may previously be selected by a separation and selection step as will be described hereinafter in detail.

Furthermore, the "adjusted focal plane" can be computed in order to find, choose and/or define the optimal focal plane maximizing the sharpness of the object of interest and thus improving the focus of the displayed image with regard to the interest of the user. In the context of the present invention the term "sharpness" may thus be understood as "optical sharpness".

Furthermore, each of the plurality of objects may be associated to one of the focal planes out of the plurality of focal planes of the provided digital pathology image data set. Furthermore, said association between the objects and the focal planes is such that when choosing a focal plane for displaying the associated/corresponding object, this object is displayed in a sharp and proper way. In other words, the object lies in the focal plane which is associated to said respective object.

Furthermore, it should be understood that the image comprises respective images of the objects, however the term "the image comprises a plurality of objects" is used in the context of the present invention as this is a clear terminology for the person skilled in the art.

Especially in the case of histopathology image data, which are 3D data, the present invention realizes its advantages because an improved auto focusing is provided through the three dimensions depicting for example loose cells. Said advantages will become clearer from the following description.

By carrying out the presented method the focus is automatically adjusted to obtain an optimal focus for a position indicated by the user. The use might be e.g. a pathologist desiring to fastly and easily scroll through a displayed digital pathological image. As indicator for this position of interest, for example the mouse pointer can be used. In said case, the pathologist uses the mouse pointer to indicate the position of interest. In case of an image comprising cells, the focus is adjusted in such a way that the cell or the cells closest to the mouse pointer are in focus. Therein, the cells are to be understood as the objects that are comprised by the digital pathology image. As an alternative to the mouse pointer, as indicator for the position of interest, the position that is looked at on e.g. a screen can be used. The position which is looked at by the user might be determined by e.g. an automatic gaze tracking step or system. Thus, accurate automatic gaze tracking in combination with autofocus adjustment or a digital pathology image is presented. A pathologist analyzing for example images comprising a plurality of cells may strongly rely on the proper and exact adjustment of the focus of the image. Such a feedback or combination of automatic gaze tracking with autofocus adjustment of a digital pathology image was impossible for analysis with a standard microscope. However, this drawback of the prior art is overcome by the present invention, as it is described above.

An advantage of such a presented method is that the derivation of the optimal focal plane values is limited to the locations the pathologist is interested in. Thus, less computational effort is needed and a faster focusing is realized.

In other words, the presented method might be described as determining the position in the image the pathologist is interested in, identifying the corresponding cell or the object of interest, compute the focal plane that optimizes the focus of the cell or the object, and visualizing the image at the computed focal plane. Therein, the term "computing" shall be understood as calculating.

In the context of the present invention the three-dimensional digital pathology image data may be displayed to a user in a two-dimensional form on e.g. a screen.

The presented method may be seen as an intelligent method for automatically adjusting the focus of a digital pathology image as there is a feedback implemented, which feedback takes into account the actual desired position of interest of the user. Such adjustment can be made in real-time while the user changes from one desired position to another. Said feedback will be described in more detail hereinafter.

In case the individual biological object is defined as the one with the smallest distance to the position of interest, the presented method unambiguously decides which focal plane has to be selected from the plurality of focal planes from the image data. Said decision is able to ensure that not an intermediate focal plane is chosen. Thus the present invention avoids that a focus is adjusted to a height within the three-dimensional data, in which none of the objects is displayed properly. In contrast to this disadvantage of the prior art, the present invention unambiguously determines the closest object to the determined position of interest and focuses said closest object by selecting the corresponding focal plane. Therein, the selected focal plane maximizes the sharpness of the defined object of interest during the displaying. In other words, the selected focal plane corresponds to the previously defined object of interest or is associated with the defined object of interest.

In addition or alternatively, a step of manually changing a focal plane by a user may be part of the presented method. Therein, the focal plane might be moved up or down with regard to the beforehand displayed focal plane. Therein "up" and "down" describe the direction through three-dimensional data and indicate the height within the objects or within the three-dimensional data. Thus, the step of fine adjustment performed e.g. by a user can be seen as an additional possibility of the presented method.

The three-dimensional digital pathology image data can be in general pathology data or cytopathology image data and/or molecular pathology data in special. In said cases the intelligent method for automatically adjusting the focal plane may be especially valuable.

In a further embodiment, if desired, an alternative step of determining which object of the plurality of objects corresponds to the determined position of interest can be comprised additionally.

Moreover, the step of computing which focal plane of the plurality of focal planes optimizes the sharpness of the object of interest for displaying can also alternatively be comprised within the presented method as another exemplary embodiment. Such a computing may result in an optimal focal plane for displaying the desired object of interest.

According to another exemplary embodiment of the invention the method further comprises the step of calculating for at least two objects out of a plurality of objects of the provided image data which of the two objects the smallest distance to the determined position of interest has, shows or exhibits.

In other words the provided three-dimensional digital pathology image data comprise or depict at least two objects for which the respective distance to the determined position of interest is calculated. Based on both results a comparison may be performed between said two results. A decision may be made automatically to decide which one of the both objects is the object of interest and auto focusing onto said object may be performed. Of course this may be performed for more than two objects.

According to another exemplary embodiment of the invention, the method further comprises the steps of calculating the spatial extent of at least two objects, wherein the step of calculating the smallest distance comprises the step of determining the respective distance between the spatial extent of the respective object and the position of interest.

Thereby the term distance between the spatial extent of the respective object and the position of interest is to be seen as the minimum distance.

By calculating the volume or spatial extent or the coordinates of the spatial border of the at least two objects, the step of calculating the smallest distance to the determined position of interest is performed in a fast and efficient way. For example, pixels of the image may be used to describe the spatial border of an object which pixels might be used during the calculation of the distance to the position of interest.

According to another exemplary embodiment, the method further comprises the steps of assigning to pixel locations of the displayed image the object which is closest to the respective pixel location, and assigning to said pixel locations the respective focal plane that optimizes the sharpness of the closest object.

In another exemplary embodiment the previously described embodiment may further comprise one or several of the following steps: generating an assigning data set, storing the assigning data set, defining a pixel location of interest from the determined position of interest, retrieving the assigned focal plane from the assigning data set for the pixel location of interest, and using the retrieved focal plane as adjusted focal plane during the step of automatically adjusting. Any combination of said steps may be used by the person skilled in the art if desired. In other words, this embodiment assigns to all or several pixel locations the respective focal plane which optimizes the focus at the image location and stores this information for example in a look-up table. Generally, this may be seen as an assigning data set. Furthermore, this embodiment determines the position in the image the pathologist is interested in, which step corresponds to determining the position of interest. Furthermore this embodiment retrieves the optimal focal plane from the assigning data set, for example from the look-up table and visualizes the image at the retrieved focal plane. An advantage of this embodiment may be seen in that those computations can be done offline. Offline pre-processing of the data can reduce the computational load of the algorithm during runtime/visualisation.

Figure 4:
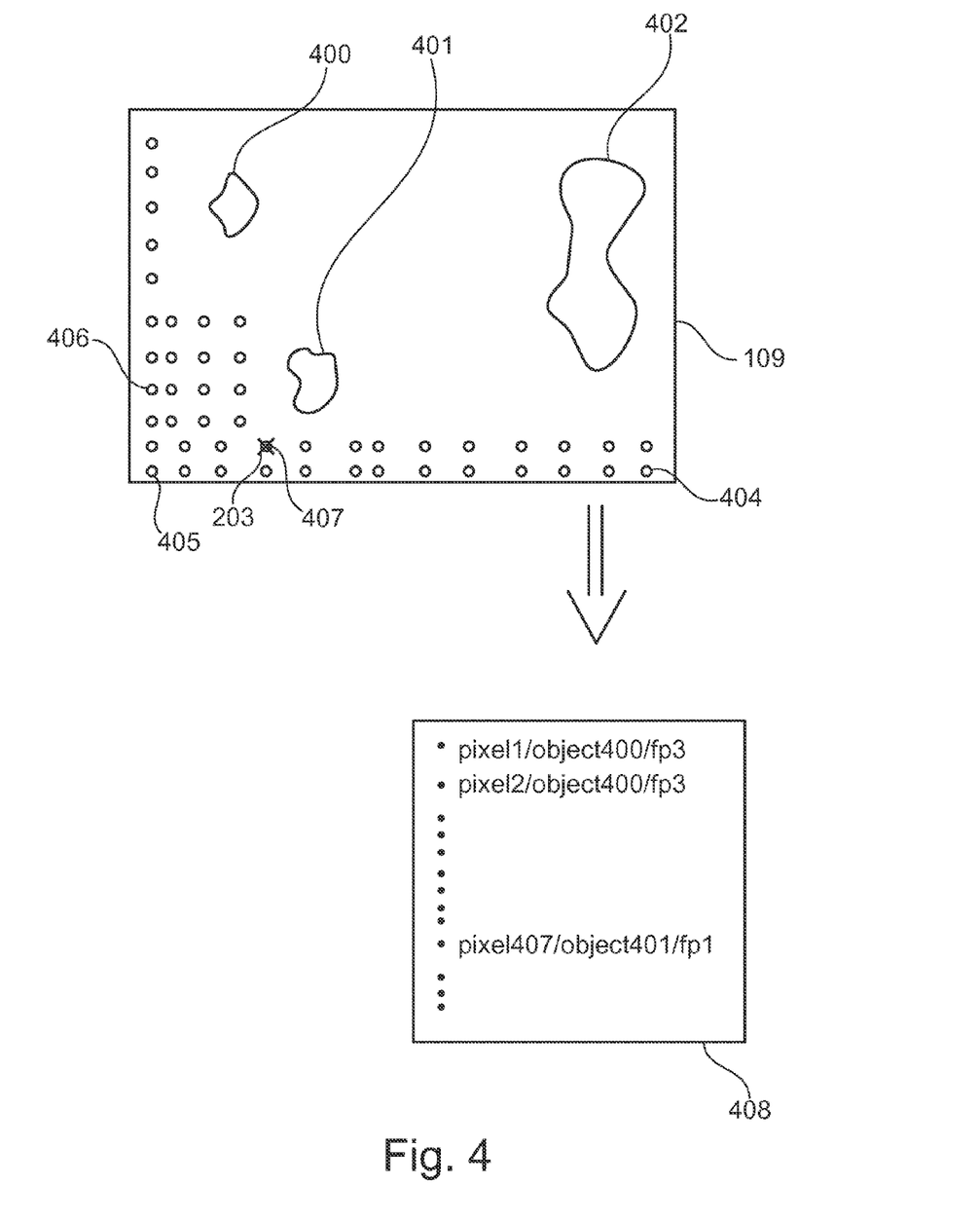
FIG. 4 schematically shows an assigning process according to an exemplary embodiment of the present invention.

As might for example be gathered from FIG. 4, a clear association between pixels of the displayed image, the closest object to each pixel and the optimal focal plane for that closest object is established or generated in an assigning data set. In other words, by choosing one pixel of the image and by referring to the previously determined assigning data set, a user or also a computer system is able to retrieve which object is the object of interest e.g. the closest object and which focal plane is to be used in order to display said object of interest in a proper and sharp way to a user like a pathologist.

Furthermore, the present invention may be directed to a method for loose cell analysis, wherein the displayed digital pathology image comprises cells or parts of cells like cell nuclei as objects.

Furthermore, it shall be noted that for the above and below described embodiments of the present invention, an automatic focus adjusting is presented which is performed in such a way that an optical sharpness of the object of interest is maximized during the step of displaying. In other words, there is a feedback line presented in displaying the image which feedback line is provided with information about the optimal focal plane which information is calculated based on the actual position of interest. Such a position of interest is determined, for example, by means of gaze tracking. This may be seen as tracking of the location in the image the user is looking at. Furthermore, this determination can alternatively be based on analyzing the characteristics of a mouse pointer that is moving over the image on a screen.

According to another exemplary embodiment of the invention, a device for displaying images and for automatic focal plane adjustment of a digital pathology image is presented. The device comprises a receiving arrangement configured to receive three-dimensional digital pathology image data, which image data comprise a plurality of focal planes. The device further comprises a display arrangement configured to display the digital pathology image data as an image to for example a user like a pathologist. Therein, the displayed image has a focal plane which is a focal plane of the plurality of focal planes. The device further comprises a determination arrangement configured to determine a position of interest in the image. As an example, the determination arrangement might be embodied as a gaze tracking arrangement or as a motion tracking arrangement as will be described hereinafter and as has been described before. The device further comprises a calculation arrangement configured to calculate which individual biological object comprised or shown in the image, is the object of interest. For example which object has the smallest distance to the determined position of interest may be taken into account. Furthermore, the device comprises an adjusting arrangement configured to automatically adjust the focal plane of the displayed image to an adjusted focal plane based on the calculated object of interest. The adjusting arrangement may thus be configured to focus the object of interest based on the result of the calculation of the object of interest.

Such a device may be embodied as for example a computer or also as a display or screen which comprises the above explained arrangements.

According to another exemplary embodiment of the invention, a program element for automatically adapting the focal plane of a digital pathology image comprising a plurality of objects, which, when being executed by a processor is adapted to carry out the following steps: The steps are determining a position of interest in the image. Further the step of calculating which individual biological object out of the plurality of objects is the object of interest, and automatically adjusting the focal plane of the displayed image to an adjusted focal plane based on the calculated object of interest. Upon performing said steps a focusing of the object of interest is performed.

Thereby, the term "program element" may be seen as a whole complete computer program or may also be seen as a part of a computer program. Such a part of a computer program might be downloaded and integrated in an already existing computer program as an update to be able to carry out the present invention.

According to another exemplary embodiment of the invention, a computer-readable medium is presented in which a program element for automatically adapting the focal plane of a digital pathology image comprising a plurality of individual biological objects is stored, which program element, when being executed by a processor is adapted to carry out determining a position of interest in the image, calculating which individual biological object out of the plurality of objects is the object of interest, and automatically adjusting the focal plane of the displayed image to an adjusted focal plane based on the calculated object of interest. Upon performing said steps a focusing of the object of interest is performed.

The computer-readable medium may be seen as a storing medium like for example a USB stick, a CD, a DVD, a data storage device, a hard disc, or any other medium on which a program element as described above can be stored.

It might be seen as a gist of the invention to provide for an intelligent autofocus method and device which is able to couple a feedback from the behaviour of the user, for example by gaze tracking, to the actually focal representation of an image and adjust the imaging setup accordingly with regard to the focal plane. The adjustment is performed in such a way that the focal plane is selected which optimizes and sharpens the actual object of interest which was previously determined.

These and other aspects of the invention will become apparent from and elucidated with reference to the embodiments described hereinafter.

BRIEF DESCRIPTION OF THE DRAWINGS

Exemplary embodiments of the invention will be described in the following drawings.

DETAILED DESCRIPTION OF EMBODIMENTS

Figure 1:
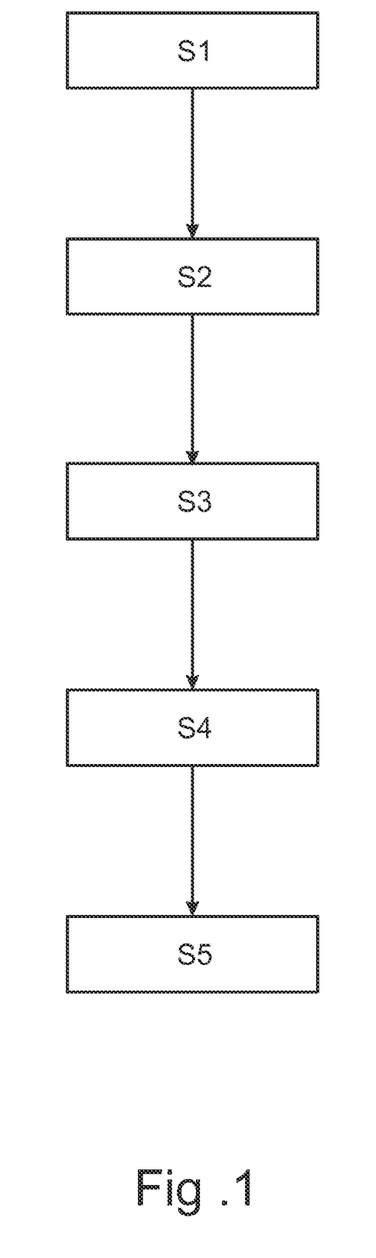
FIG. 1 schematically shows a flow diagram of a method according to an exemplary embodiment of the invention.

FIG. 1 shows a flow diagram of a method for automatically adjusting a focal plane of a digital pathology image according to an exemplary embodiment of the present invention. The image used in said method comprises a plurality of individual biological objects. The depicted method comprises the step of providing for three-dimensional digital pathology image data comprising a plurality of focal planes S1, and as a second step displaying the digital pathology image data as an image S2. Thereby, the displayed image has a focal plane which is from the plurality of focal planes. As a further step, determining a position of interest in the image a user has (S3) is depicted as step S3. The step S4 describes the step of calculating which individual biological object out of the plurality of objects is the object of interest. This calculation may also be embodied as deciding which object of the plurality of objects is the closest to the determined position of interest. For example, the object with the smallest distance may be defined as the object of interest. Also other criteria may be used. Furthermore, automatically adjusting the focal plane of the displayed image to an adjusted focal plane based on the calculated object of interest is included. In other words while or upon adjusting the focal plane a step of focusing the object of interest is performed. Upon performing said steps a focusing of the object of interest is performed.

The three-dimensional digital pathology image data describes three-dimensional digital objects. This data might be seen as imaging data generated through for example a medical imaging apparatus or an imaging apparatus used in pathology or cytopathology.

The present method of FIG. 1 overcomes several disadvantage of the prior art. Due to the determination of the individual biological object of interest based on the determined position of interest, the method according to the present invention bases the decision for focal adjustment only on one individual biological object like for example an individual cell or an individual cell nucleus. The method of the present invention further specifies to adjust the displaying based on the determined individual biological object of interest. For example the focal plane may be chosen for adjusting the displaying, which focal plane maximizes the sharpness of the calculated object of interest. Consequently, the presented method ensures, that at least one individual biological object is displayed in an optimal way to the user regarding sharpness. In other words the presented method enables for a calculation of the best focal plane for the calculated object of interest which unambiguously leads to a sharp optical representation of the object of interest. Thus, compromises regarding the sharpness of displayed individual biological objects in digital pathology image are avoided by the presented method.

As an additional step, which is not shown, the method of FIG. 1 might comprise the step of defining the object of the at least two objects out of the plurality of objects having the smallest distance as the object of interest.

Furthermore, the step of automatically adjusting S5 may be understood as selecting one focal plane of the plurality of focal planes and thereby maximizing the sharpness of the object of interest in the displayed representation on e.g. a screen. In other words, a step of deciding is presented in which is automatically decided which of the focal planes stored in the digital pathology image data illustrates the object of interest in the sharpest way. This focal plane which is the optimal focal plane may be automatically selected. Subsequently, the displaying of the data may accordingly be adjusted by the presented method of FIG. 1.

Consequently, the method depicted in FIG. 1 provides for an intelligent method for automatically adjusting the focus of a digital pathology image as there is a feedback implemented, which feedback takes into account the actual desired position of interest of the user. Due to the automatically made decision regarding the object of interest, the presented method unambiguously decides which focal plane has to be selected from the plurality of focal planes from the image data. Said decision is able to ensure that not an intermediate focal plane is chosen. Thus the present invention avoids that a focus is adjusted to a height within the three-dimensional data, in which none of the objects is displayed properly. In contrast to this disadvantage of the prior art, the present invention unambiguously determines the object of interest and focuses to said object of interest by selecting the corresponding focal plane. Therein, the selected focal plane maximizes the sharpness of the defined object of interest during the displaying. In other words, the selected focal plane corresponds to the previously defined object of interest or is associated with the defined object of interest.

Note for each object of the plurality of objects it is compulsory to calculate the respective distance. The present invention is also applicable in a mode in which the calculation or selection of the optimal plane is based on the calculated distances of only a small group of objects from the plurality of objects comprised in the data.

In other words, by means of the presented method of FIG. 1, a user who is observing a displayed image is enabled to navigate from one depth of focus to another depth of focus by changing the position of interest. This navigation can be provided to the user automatically and in real-time while be changes the position of interest. Further, this can be done by the user by for example directing his gaze to another object of interest such that the focal adjustment is amended accordingly. A device forming such a method would in this case provide for a gaze tracking arrangement. Independently from which method is used to determine the position of interest, the present invention provides for displaying the image based on the actually desired individual biological entity being the object of interest.

Figure 2:
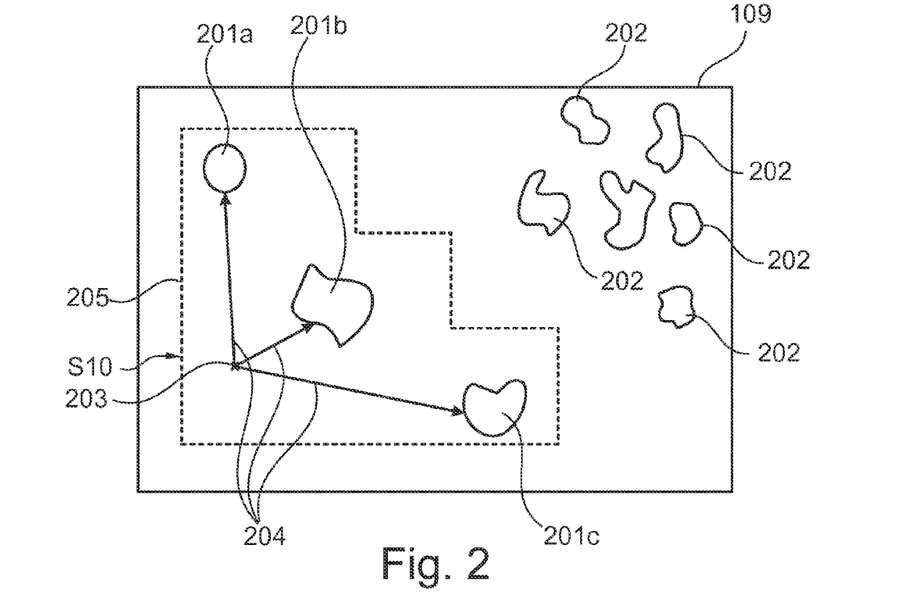
FIG. 2 schematically shows a digital pathology image in which a respective distance from a position of interest to several individual biological objects of the image is calculated according to an exemplary embodiment of the present invention.

The method depicted in FIG. 1 may be extended by the following aspects. A step of selection of a group of objects which group consists of a reduced amount of objects from the plurality of objects may be additionally performed. This step is depicted in FIG. 2 by means of a new step S10. This step may be performed automatically by a computer. But also a manual selection by the user is possible.

As a first extension possibility the step S10 of selecting a group of objects may comprise the step of defining a maximum number X of group members, examining the closest surrounding of the position of interest and determining the X objects in that surrounding.

As a second extension possibility, the step S10 of selecting a group of objects may comprise the step of dividing a circular region around the position of interest into several sectors, determining the closest object in each respective sector and performing step S4 or S6 for the respective closest objects in all the sectors.

As a third extension possibility, the step S10 of selecting a group of objects may comprise the step of defining a circular, rectangular or angular zone of a predefined first size around the position of interest.

Subsequently in each possibility as described before step S4 or S6 for objects in that zone is performed, respectively.

In case no objects are in said first zone, a step of automatically increasing the size to a second predefined size may be performed. In this case, a stepwise increase to third, fourth and more zones around the position of interest is reached until enough objects fall into or lay in said zone. Afterwards, the step S4 or S6 can be performed. However, if at an earlier stage of size definition, enough objects fall into that zone, step S4 or S6 can be performed.

In other words the method presented in FIG. 1 determines the position in the image that is of interest to a user like a pathologist. Also the movement of a computer mouse can be analyzed. The position information can be a simple and a direct interpretation of the (x,y) coordinates of the mouse pointer. A more intelligent interpretation can be based from analysis of the mouse movement, motion patterns, or by taking mouse/keyboard buttons into account.

The location on a monitor a pathologist is looking at can be automatically identified by means of gaze tracking techniques. Similar to the mouse pointer, the read-out of the gaze tracking data can be interpreted in a simple direct manner, or a more intelligent way.

Independent of how the position is determined, optimal focus may depend on the object the pathologist is looking at. The determined position may suffer from measurement inaccuracy. For example, when the chromatin pattern of nuclei needs to be analyzed, one wants to keep the focus on the nucleus area. Positioning of the mouse pointer or gaze to the immediate neighbourhood of a nucleus should be sufficient to lock onto that nucleus with regard to optical focus of the representation i.e. the displaying. If a pathologist looks at tubules structures, one may only obtain proper focus from the nuclei lining a tubule or from the nuclei inside a tubule if the tubule structure is distorted.

Rounding the determined position to the nearest structure of interest will increase both relevance and robustness of the visualization. For most applications, focus on the nearest nucleus will be sufficient. However, one might want to implement different modes of operation for different applications.

The focal plane that provides the optimal focus for the object of interest can automatically be computed from the image data in the region of interest obtained at multi focal planes.

Visualization of the image region at the computed focal plane can be done by parsing the newly obtained value of the focal plane to the viewing program. These aspects may be integrated in the embodiment of the invention depicted in FIG. 1.

FIG. 2 schematically shows a digital pathology image 109 which comprises a plurality of objects 201a, 201b, 201c and 202. The position of interest 203 is indicated by a cross that might for example be a mouse pointer of a computer mouse used by a user looking at the image 109 on a screen. The arrows 204 indicate that for the three objects 201a to 201c the respective distance to the position of interest 203 is calculated by the presented embodiment of the present invention. In the shown example of FIG. 2, the object with the smallest distance to the region of interest is consequently defined as the closest object, which in this case is object 201b. The objects may e.g. be cell nuclei.

The dashed line 205 around the group of objects 201a to 201c indicates a group of objects for which the calculation procedure is exclusively performed. The objects 202 which are more distanced from the position of interest 203 are excluded from the calculation step S4. Step S4 has been explained in the previously described FIG. 1. Therefore, the calculation of the optimal plane and the adjusting of the used focal plane to display the pathology image 109 are improved as less time for calculation or computational steps is needed. This selection of a group of objects which group consists of a reduced amount of objects from the plurality of individual biological objects like cell nuclei is herein described and depicted with the step S10. This step may be performed automatically by a computer. But also a manual selection by the user is possible.

Figure 3:
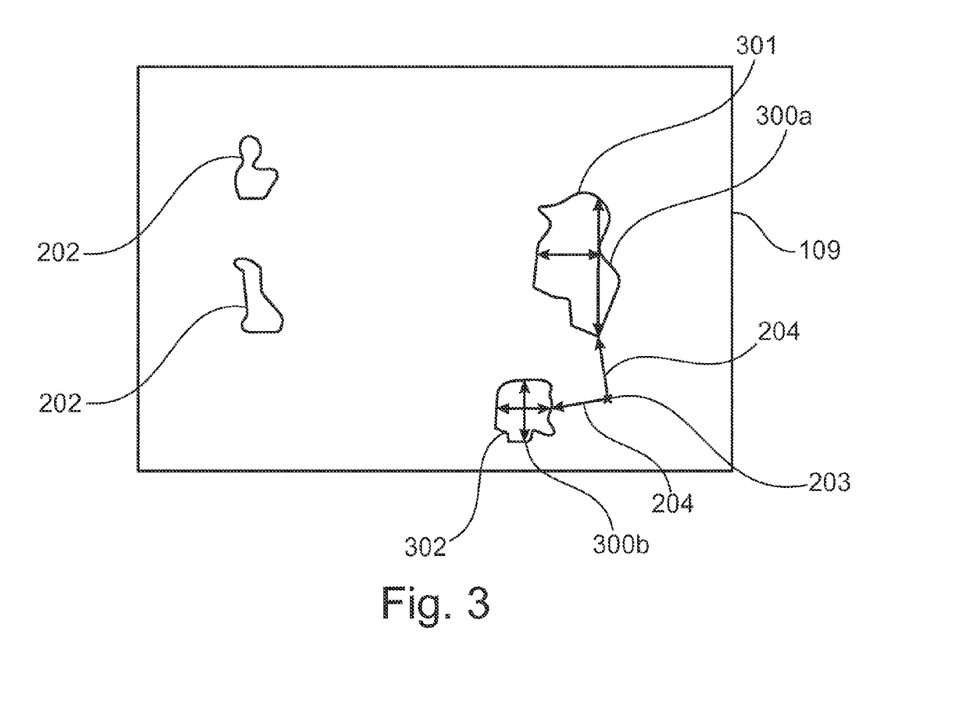
FIG. 3 schematically shows a calculation of a spatial extent of two individual biological objects according to an exemplary embodiment of the present invention.

FIG. 3 schematically shows a digital pathology image 109 with objects 202 which are not used for calculating a distance. Consequently the decision for choosing a focal plane is only based on the analysis of objects 300a and 300b. Said objects are used in order to calculate the respective distance to the position of interest 203. Arrows 204 indicate the respective distance. Furthermore, it can be seen that the spatial extent of the objects 300a and 300b is calculated in order to perform the step of calculating the distance to the position of interest. As a variation thereof, the spatial border of the objects 300a and 300b could be calculated by for example assigning pixels to the lines 301 and 302 defining the outer surface of the respective objects. It is also possible to use the respective centre of each object to compute the respective distance to the position of interest.

The above described objects 201a, 201b, 201c, and 300a and 300b are to be understood as the at least two objects out of the plurality of objects as defined within the claims and the above and previously described embodiments of the present invention.

FIG. 4 schematically depicts a digital pathology image 109 in which three objects 400, 401, and 402 are comprised by the image. For example these objects can be loose cell objects or cell nuclei. Furthermore, pixels 404 to 406 of the image 109 are exemplarily shown. Generally the pixels are part of the optical representation of the data. Furthermore, the position of interest 203 is symbolically depicted as a cross. The position or region of interest might previously have been determined by gaze tracking or by mouse pointer analysis or somewhat differently.

Furthermore FIG. 4 schematically shows an exemplary embodiment of the invention in which a method comprises assigning the object to pixel locations of the displayed image 109, which object is calculated as being the closest object to the respective pixel or pixel location. In this case, the position of interest is a cross 203 being positioned by the user at the pixel 407. As an example, before the position of interest is determined, the assigning process described hereinafter may take place. As can be seen, object 401 is the closest to pixel 407. Therefore, an entry in the assigning data set 408 is performed by the presented method in which the pixel 407 is associated with object 401 and focal plane 1. Therein focal plane 1 is found to be the optimal focal plane for said pixel 407, as object 401 is displayed in a maximal focused way by using focal plane 1. The assigning data set 408 comprises the abbreviation FP for focal plane.

This can be done for several pixels or pixel locations or can also be done for all pixels or pixel locations of the image. The assigning data set 408 might additionally be stored in a data base used in a device as it will be explained below. When the image is displayed to a user, the position of interest can be determined which is exemplarily shown here with sign 203. An identification of the position of interest 203 with the corresponding pixel 407 may be performed by the method of the exemplary embodiment described herein. Afterwards, a retrieving step is performed in which the assigned focal plane from the assigning data set for the pixel location of interest 407 is retrieved as a feedback to the input which is the user chosen position of interest. Consequently, the retrieved focal plane FP1 is used to adjust the focal plane during the step S5 of automatically adjustment as explained in detail with reference to FIG. 1.

Figure 5:
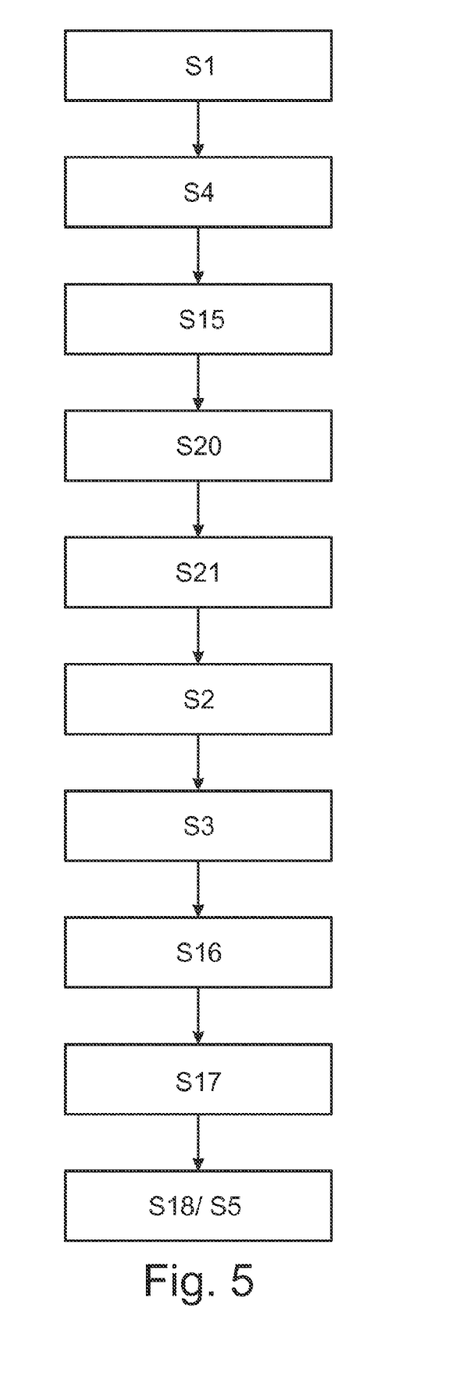
FIG. 5 schematically shows a flow diagram of a method according to an exemplary embodiment of the present invention.

FIG. 5 schematically shows another exemplary embodiment of the invention. A flow diagram is depicted in which a method for automatically adjusting a focal plane of a digital pathology image with a plurality of individual biological objects is performed. In a first step S1, three-dimensional digital pathology image data is provided. Subsequently, the calculation or determination of the object of interest is performed. This step is performed in step S4 of FIG. 5. Step S15 describes assigning to pixel locations of the displayed image the object which is closest to the respective pixel location and assigning to said pixel locations the respective focal plane that optimizes or sharpens the closest object. In doing so, an assigning data set may be generated during step S20 which data set can alternatively be stored in step S21, if desired. However, if desired the steps S15, S20 and S21 may also be performed before step S4 or after step S2.

When displaying the digital pathology image data as an image to a user in step S2, a position of interest in the image can be determined in step S3. Step S3 can comprise several technical embodiments like gaze tracking or interpreting coordinates x and y of a mouse pointer on the displayed image of the digital pathology image, analyzing motion patterns of a mouse pointer on the displayed image of the digital pathology image and/or any combination thereof.

When knowing the position of interest, a pixel location of interest may be defined thereof in step S16. Afterwards, retrieving the assigned focal plane from the already existing assigning data set for the pixel location of interest can be performed in step S17. When the method performs the automatic adjustment of the focal plane of the displayed image to an adjusted focal plane S5, thereby focussing the object of interest, the step S18 is performed. In step S18, the retrieved focal plane is used as adjusted focal plane in order to optimize the displaying of the object of interest with regard to the focus. An advantage of this embodiment may be seen in that those calculations or computations may be done offline.

It might be seen as a gist of the depicted method of FIG. 5 to provide for an intelligent autofocus method which is able to couple a feedback from the behaviour of the user, for example by gaze tracking, to the actually focal representation of an image and adjust the imaging or displaying setup accordingly with regard to the focal plane. The adjustment is performed in such a way that such a focal plane is selected, which focal plane optimizes and sharpens the actual object of interest which was previously determined.

Figures 6A, 6B:
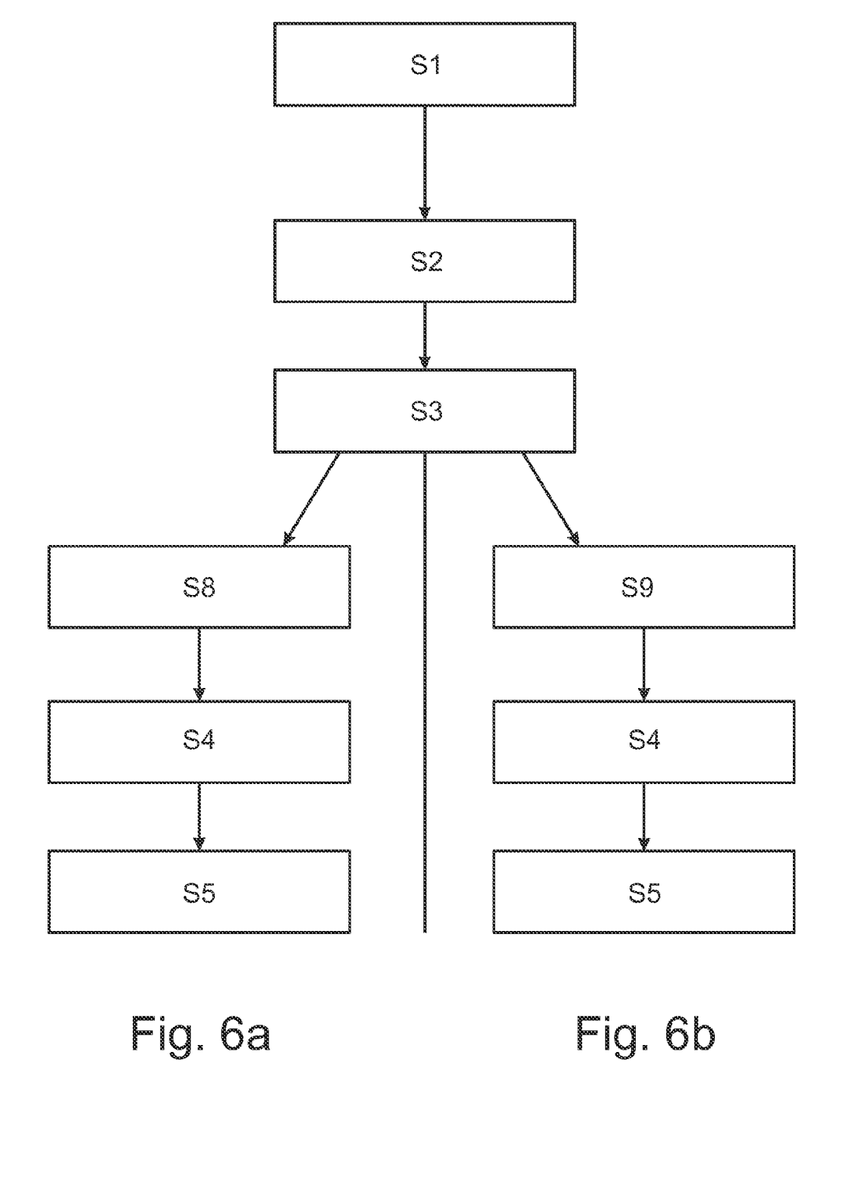
FIGS. 6A and 6B schematically show two flow diagrams of two different embodiments of a method according to the present invention.

FIGS. 6A and 6B separately depict an exemplary embodiment of a method according to the present invention. The first three steps S1 to S3 are commonly performed for both methods described in FIG. 6A and FIG. 6B. These steps S1 to S3 have been described in detail with regard to FIG. 1 and can be gathered there from. The exemplary embodiment of a method for automatically adjusting a focal plane of a digital pathology image as described in FIG. 6A provides for a step of automatically tracking a gaze of the user in step S8. Afterwards, a calculating which individual biological object out of the plurality of objects is the object of interest S4 is performed. Furthermore, step S5 is performed as described with regard to FIG. 1.

In contrast to FIG. 6A, the exemplary embodiment of the method shown in FIG. 6B comprises step S9 in which a step of analyzing a movement of a pointer of a computer mouse is performed. The step S9 may further comprise interpreting coordinates x and y of the mouse pointer on the displayed image of the digital pathology image data. Alternatively or in addition S9 may comprise analyzing motion patterns of a mouse pointer on the displayed image of the digital pathology image data. Subsequently, steps S4 and S5 as described with regard to FIG. 1 are performed.

Figure 7:
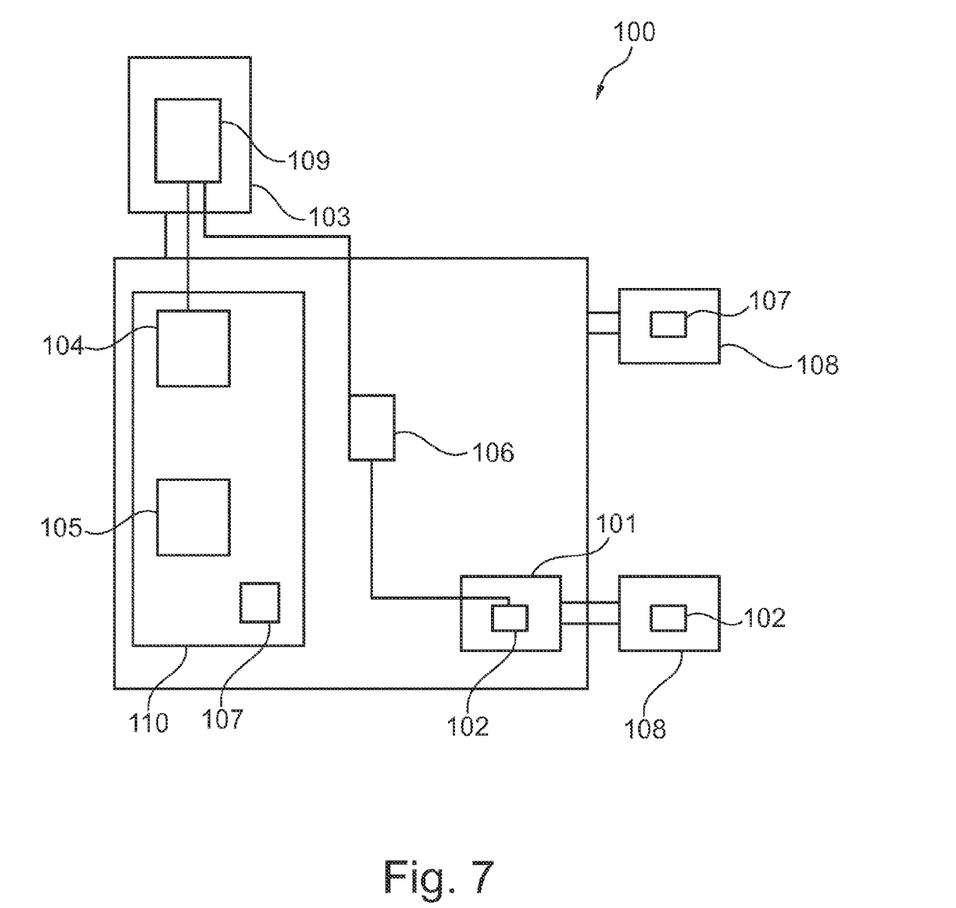
FIG. 7 schematically shows a device according to an exemplary embodiment of the present invention.

FIG. 7 schematically shows a device 100 for displaying images and for automatic focal plane adjustment of a digital pathology image 109. This device comprises a feedback which takes into account the actual desired position of interest of the user. Thus, the presented device enables to perform an intelligent way of automatically adjusting the focus of a digital pathology image. The shown display comprises a receiving arrangement 101 configured to receive three-dimensional digital pathology image data 102. Such a receiving arrangement may be embodied as e.g. a bus, port or connector of the device 100. For example a USB port may be comprised by the device 100 as receiving arrangement 101. The receiving arrangement 101 may be seen as an interface of device 100, which interface provides for the receipt of the three-dimensional digital pathology image data 102. The image data comprises a plurality of focal planes. Herein, the data is shown on a computer-readable medium 108 which is connected to a receiving arrangement 101 of the device. Furthermore, a display arrangement 103 is shown which can be embodied as e.g. a screen, a display, a liquid crystal display (LCD) device, a light emitting diode (LED) device, an organic light emitting diode (OLED) device or e.g. a projector. The determination arrangement 104 is shown which is configured to determine a position of interest in this image. The determination arrangement 104 may be configured e.g. as a gaze track arrangement configured to automatically track a gaze of the user or e.g. as a motion track arrangement configured to automatically track a pointer of a mouse. It can be seen that the determination arrangement 104 is connected via a line with the display arrangement 103 and with the image 109. This line symbolically describes, that the determination arrangement 104 may receive an input signal, based on which the determination arrangement 104 determines the actual desired position of interest. In other words the determination arrangement 104 is configured to communicate with the display arrangement 103. Such an input may be provided as a tracked gaze signal or as coordinates of a mouse pointer or as a motion pattern or motion path of the mouse pointer. The determination arrangement 104 may also be configured to directly communicate with the adjusting arrangement 106 and or with the calculation arrangement 105.

The calculation arrangement 105, which might be embodied as a processor or a CPU, is configured to calculate for at least two objects out of the plurality of objects which of the two objects has the smallest distance to the determined position of interest. Thereby, the object with the smallest distance may be defined as object of interest. Furthermore, the shown adjusting arrangement 106 is configured to automatically adjust the focal plane of the displayed image to an adjusted focal plane, thereby focussing the object of interest. The adjusting arrangement 106 may also be part of the calculating arrangement 105 and may thus also be embodied as a processor or CPU. For example the calculating arrangement 105 and the adjusting arrangement 106 may be embodied as a processor which calculates for at least two objects out of the plurality of objects the one with the smallest distance with respect to the determined position of interest. Afterwards such a processor may determine the respective focal plane which maximizes the sharpness of the calculated object of interest and adjusts the display arrangement 103 to display the image with the determined focal plane. However, the adjusting arrangement 106 and the calculating arrangement 105 may also be separated components as shown here in FIG. 7. In other words, the device 101 provides for an intelligent feedback loop for the adjustment of the focal plane of the image, which feedback loop may be fed via the determination arrangement 104. The determination arrangement 104 may regularly or irregularly perform an update of the displayed image regarding the focus, based on an actual measurement of the actually desired position of interest, by using gaze tracking or by analyzing motion patterns of a mouse pointer on the displayed image.

Figure 8:
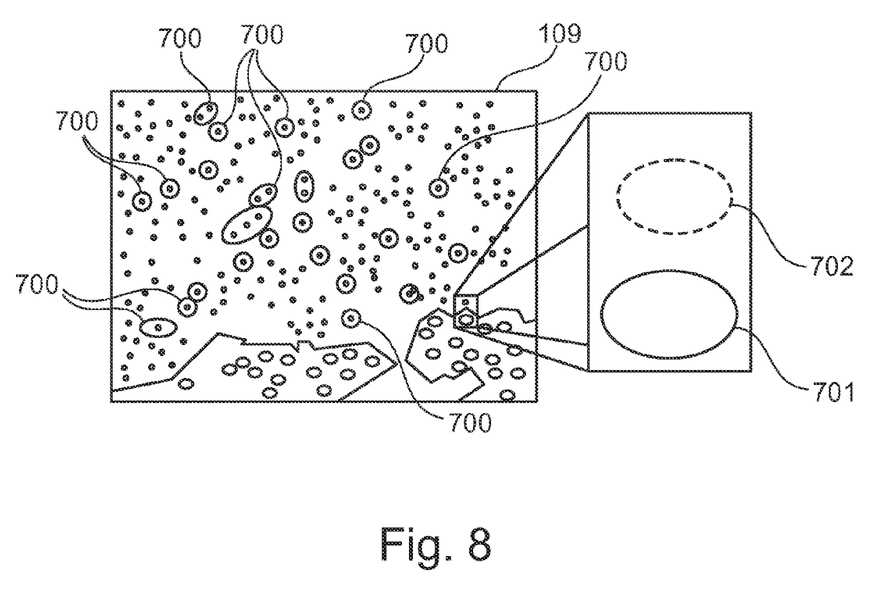
FIG. 8 schematically shows a digital pathology image as can be used with the present invention.

FIG. 8 shows a digital pathology image 109 that can be seen as an example of focus variation within a tissue sample. On the right hand side a magnification window observed at 20× magnification is shown. The depicted cell nuclei 700 have proper focus. In other words, the focal plane is adjusted correctly for the objects 700. As, however, can be seen from the magnification window on the right hand side, only nucleus 701 is in focus, and the neighboured nucleus 702 is extremely out of focus. By means of looking at the nucleus 702, or by pointing with a mouse onto that nucleus 702, the method and the device according to the present invention perform an automatic focal plane adjustment in such a way that nucleus 702 will automatically and quickly be displayed sharp and in proper focus.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

The invention claimed is:

1. A method for automatically adjusting a focal plane of a digital pathology image, which images comprise a plurality of individual biological objects, the method comprising the step of:
generating and storing three-dimensional digital pathology image data comprising a plurality of images, each image in a different one of a plurality of focal planes;
displaying one of the plurality of images on a display device;
determining a position of user interest in the displayed image;
automatically calculating which individual biological object out of the plurality of objects is closest to the position of user interest as an object of user interest;
determining one focal plane of the plurality of focal planes which optimizes sharpness of the object of user interest; and
automatically adjusting the display device to display of the one of the plurality of images corresponding to the focal plane which optimizes the sharpness of the object of user interest.

2. The method according to claim 1, wherein the step of calculating the object of interest comprises the step of:
calculating for at least two objects out of the plurality of objects which of the two objects has a smallest distance to the determined position of user interest, and
wherein the object with the smallest distance is the object of interest.

3. The method according to claim 1, wherein the step of determining the position of user interest in the displayed image comprises the step of:
automatically tracking a gaze of the user such that as the user's gaze moves to each location of user interest;
adjusting the display device to display one of the images which optimize a sharpness of each object of user interest.

4. The method according to claim 1, wherein the step of determining the position of user interest in the image comprises the step of:
analyzing a movement of a pointer of a computer mouse.

5. The method according to claim 1, wherein the method is for loose cell analysis and the objects are parts of cells.

6. The method according to claim 1, wherein calculating the individual biological object which is closer to the position of interest includes:
selecting a group of objects, the group of objects consisting of a reduced amount of objects out of the plurality of objects; and
wherein the step of determining the closest object is performed only for objects in the selected group of objects.

7. A method for automatically adjusting a focal plane of a digital pathology image, which image comprises a plurality of individual biological objects, the method comprising the step of:
providing for three-dimensional digital pathology image data comprising a plurality of focal planes;
displaying the digital pathology image data as an image;
wherein the displayed image has a focal plane which is one of the plurality of focal planes;
determining a position of interest in the image a user has;
selecting a group of objects, the group consisting of a reduced amount of objects out of the plurality of individual biological objects;
automatically calculating which individual biological object out of only the selected group of objects is the object of interest based on the previously determined position of interest, wherein the step of calculating the object of interest comprises the steps of:
calculating for at least two objects out of the selected group of objects which of the two objects has the smallest distance to the determined position of interest, and
wherein the object with the smallest distance is the object of interest, and
automatically adjusting the focal plane of the displayed image to an adjusted focal plane based on the calculated object of interest.

8. The method according to claim 7, the method further comprising the steps of:
calculating a spatial extent of at least two objects, and
wherein the step of calculating the smallest distance comprises the step of:

determining the respective distance between the spatial extent of the respective object and the position of interest.

9. The method according to claim 7, the method further comprising the steps of:
defining a spatial border of each of the at least two objects, and
determine the respective distance from the respective spatial border to the position of interest.

10. The method according to claim 7, further comprising the steps of:
assigning each pixel location of the displayed image to a closest object and assigning each said pixel locations to a respective one of the focal planes that optimizes a sharpness of the closest object,
defining a pixel location of interest from the determined position of interest,
retrieving the focal plane assigned to the pixel location of interest, and
retrieving and displaying in the pathology image data in the focal plane assigned to the pixel location of interest.

11. A device for displaying images and for automatic focal plane adjustment of a digital pathology image which image comprises a plurality of individual biological objects, the device comprising:
a memory configured to receive previously generated three-dimensional digital pathology image data, arranged in a plurality of focal planes,
a display configured to display the digital pathology image data in one of the focal planes as a displayed image,
a device configured to determine a position of user interest in the displayed image,
a processor configured to:
automatically calculate which individual biological object of the plurality of objects is the object of user interest based on proximity to the determined position of user interest,
determine a one of the focal planes in which the object of user interest is sharpest, and
control the display to display the image data in the one of the focal planes in which the object of user interest is sharpest.

12. The device according to claim 11, wherein the device configured to determine the position of user interest includes:
a gaze tracking device configured to automatically track a gaze of the user, such that as the user's gaze moves from one position of user interest to another, the processor controls the display to display the image data in an one of the focal planes in which another object of interest is sharpest.

13. The device according to claim 11, wherein the device configured to determine the position of user interest includes:
a mouse by which a user moves a pointer to designate the position of user interest.

14. The device according to claim 11, wherein the processor is configured to calculate the biological object of user interest by:

selecting a group of objects consisting of a reduced amount of objects of the plurality of biological objects;
calculating which object of the selected group of objects has a smallest distance to the determined position of interest;
designating the object with the smallest distance to the position of user interest as the object of user interest.

15. A non-transitory computer-readable medium carrying a program which when executed by a processor controls the processor to:
receive three-dimensional digital pathology image data arranged in a plurality of focal planes;
control a display device to display the digital pathology image data in one of the focal planes as a displayed image;
receive an indication of a position of user interest in the displayed image, the displayed image including a plurality of the individual biological objects;
select a group of objects, the group consisting of a reduced number of objects out of the plurality of objects;
determining which of the objects in the group is a smallest distance from the position of user interest as an object of user interest;
determining a one of the plurality of focal planes in which display of the object of user interest is optimized; and
controlling the display to change the displayed image to an image corresponding to the digital pathology image data in the focal plane which optimizes display of the determined object of user interest.

16. A device for displaying images and for automatic focal plane adjustment of a digital pathology image, which digital pathology image includes a plurality of individual biological objects, the device comprising:
a memory configured to receive and store three-dimensional image pathology data arranged in a plurality of focal planes, each focal plan being displayable as a displayed image;
a display device configured to display the digital pathology image data in one of the focal planes as the displayed image;
a processor configured to:
receive a position of user interest in the displayed image,
select a group of objects in the displayed image, the group consisting of a reduced number of objects out of the plurality of objects;
determine which object of the group of objects has a smallest distance to the position of user interest, the object with the smallest distance to the position of user interest being an object of user interest,
select the digital pathology data in an optimal focal plane for the determined object of user interest, and
control the display device to display the digital pathology image data in the optimal focal plane.

* * * * *